(12) United States Patent
Hiddessen et al.

(10) Patent No.: US 6,382,243 B2
(45) Date of Patent: May 7, 2002

(54) PRESSURE-REDUCING VALVE

(75) Inventors: Ralf Hiddessen, Lehvte-Arpke; Holger Wagner, Hannover, both of (DE)

(73) Assignee: Mass Magnet GmbH, Hannover (DE)

( * ) Notice: Subject to any disclaimer, the term of this patent is extended or adjusted under 35 U.S.C. 154(b) by 0 days.

(21) Appl. No.: 09/761,418

(22) Filed: Jan. 16, 2001

(30) Foreign Application Priority Data

Feb. 17, 2000 (DE) .......................................... 100 07 291

(51) Int. Cl.[7] .............................................. G05D 16/10
(52) U.S. Cl. ............................. 137/505.18; 137/505.27
(58) Field of Search ...................... 137/505.18, 505.26, 137/505.27

(56) References Cited

U.S. PATENT DOCUMENTS

| | | | | |
|---|---|---|---|---|
| 2,805,680 A | * | 9/1957 | Longbottom | |
| 3,087,705 A | * | 4/1963 | Hamilton | |
| 3,392,749 A | * | 7/1968 | Gneiding et al. | ...... 137/505.18 |
| 3,873,063 A | * | 3/1975 | Illing | ............... 137/505.18 |

FOREIGN PATENT DOCUMENTS

| | | |
|---|---|---|
| DE | 29618080 U1 | 9/1996 |
| EP | 0 086 902 B1 | 8/1983 |

* cited by examiner

Primary Examiner—Stephen M. Hepperle
(74) Attorney, Agent, or Firm—Muramatsu & Associates

(57) ABSTRACT

The pressure-reducing valve according to the invention makes available at its secondary pressure connection a generally adjustable secondary or working pressure which can be used by connected compressed-air consumers. The pressure-reducing valve provides a constant working pressure irrespective of fluctuations in the primary pressure or in the consumption of compressed air by the compressed air consumers. In the pressure-reducing valve according to the invention, a second pressure chamber in the central region of the slide is exposed to the primary pressure via a primary pressure connection. First and third pressure chambers at the end regions of the slide are, on the other hand, exposed to the secondary pressure via a secondary pressure connection. In addition, third and fourth chambers are connected to one another by way of a third connecting duct.

9 Claims, 4 Drawing Sheets

PRESSURE-REDUCING VALVE

Figure 1:
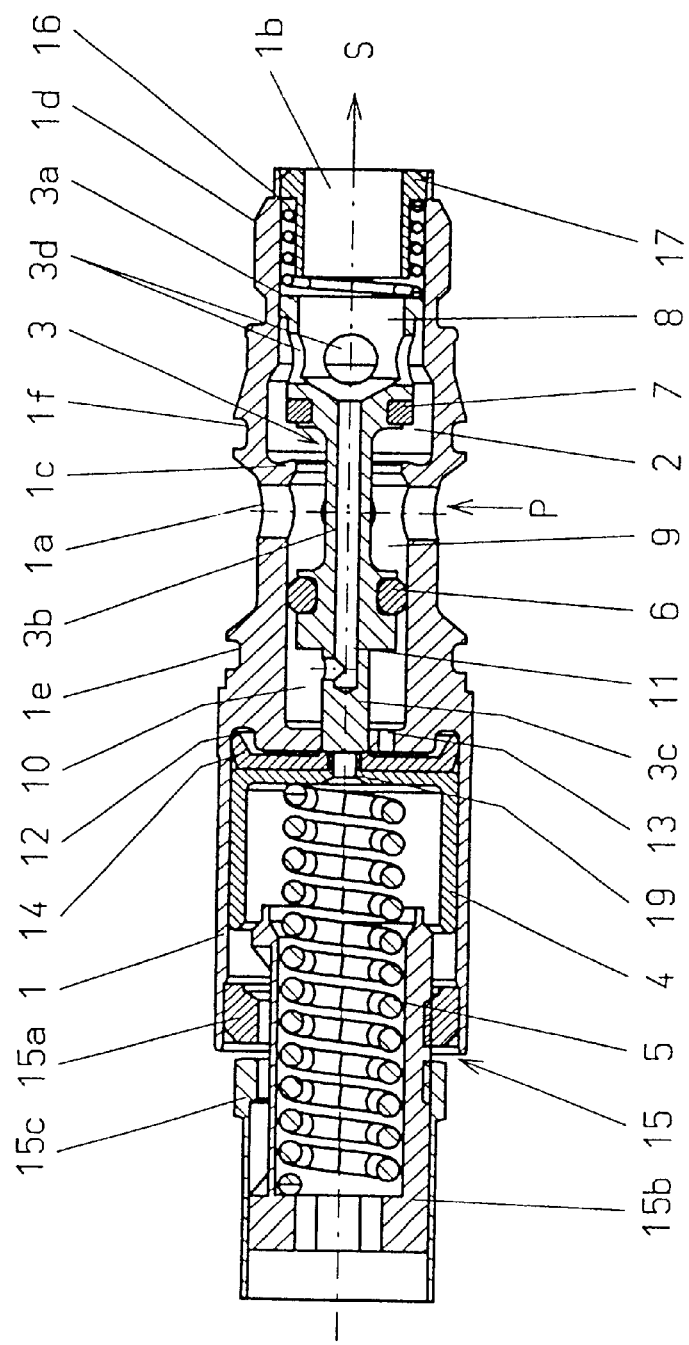

The invention relates to a pressure-reducing valve according to the preamble of claim 1.

Such pressure-reducing valves make available at their secondary pressure connections a generally adjustable secondary or working pressure which can be used by connected compressed-air consumers. The pressure-reducing valve provides a constant working pressure irrespective of fluctuations in the primary pressure or in the consumption of compressed air by the compressed-air consumers.

DE-U-296 18 080 discloses a pressure regulator comprising a primary duct which, in operation, guides a pressure medium which is under a primary pressure, a secondary duct which is provided in order to guide a pressure medium which is under a secondary pressure, a control valve which is provided in the connection between the primary duct and the secondary duct and which has a valve member which is used to influence the passage cross-section available to the pressure medium, and a control chamber which can be acted upon by the secondary pressure and which is delimited by a movable wall, the outside of which, remote from the control chamber, is acted upon by an adjusting spring and the inside of which, facing the control chamber, cooperates with the valve member. The primary duct, the secondary duct and the control chamber of the pressure regulator, which chamber is formed separately from the secondary duct, are connected to an electrically operated control valve device which can be switched over between a working position, in which it produces a connection between the control chamber and the secondary duct, and a closing position in which it produces a connection between the control chamber and the primary duct.

The known pressure regulator is very complicated in terms of its structure and also requires an external electrically operated control valve device.

A structurally substantially more compact pressure-reducing valve which can additionally be in the form of a functional screw fitting, is known from EP-B-0 086 902. It has the following components:
 a valve housing which has a primary pressure connection and a secondary pressure connection,
 a first connecting duct provided in the valve housing between the primary pressure connection and the secondary pressure connection,
 a slide which is movable to and fro in the valve housing between an opening and a closing position of the first connecting duct,
 an operating element which forces the slide into the opening position by means of a spring,
 seals which are provided between the valve housing and the slide and by means of which a first pressure chamber is formed at one end region of the slide, a second pressure chamber is formed in the central region of the slide and a third pressure chamber is formed at the other end region, the first and second pressure chambers being connected to one another in the opening position of the slide by way of the first connecting duct,
 a second connecting duct formed in the slide and connecting the first and third pressure chambers to one another,
 and a fourth pressure chamber which is provided in the region of the operating element and which is in operative connection with the secondary pressure connection by way of a third connecting duct provided in the valve housing, the secondary pressure prevailing in the fourth pressure chamber acting on the operating element against the force of the spring.

That known pressure-reducing valve has a primary pressure relief, as a result of which the spring forcing the slide into the opening position can be correspondingly smaller and more compact.

On the basis of that prior art, the problem of the invention is to provide a pressure-reducing valve according to the preamble of claim 1 which has secondary pressure relief and which is distinguished by a simple and compact structure.

According to the invention, the problem is solved by the features of claim 1.

Further forms of the invention are the subject-matter of the subsidiary claims.

In the pressure-reducing valve according to the invention, the second pressure chamber in the central region of the slide is exposed to the primary pressure via the primary pressure connection. The first and third pressure chambers at the end regions of the slide are, on the other hand, exposed to the secondary pressure via the secondary pressure connection. In addition, the third and fourth pressure chambers are connected to one another by way of the third connecting duct.

In a preferred embodiment, a second spring is also provided which forces the slide in the direction towards the operating element. In addition, the seal provided between the first and second pressure chambers cooperates with a valve seat.

In a special embodiment, a ventilation opening is provided in the fourth pressure chamber and is arranged in the contact region between the operating element and the slide.

In order to set the set pressure, in a preferred embodiment an adjusting device is provided for setting the preloading of the first spring, the slide being moved from the opening position into the closing position when the secondary pressure prevailing in the fourth pressure chamber exceeds the set pressure.

The form according to the invention also requires only three seals which are provided between the first and second pressure chambers, between the second and third pressure chambers and for sealing the fourth pressure chamber. The third seal provided for sealing the fourth pressure chamber may be in the form of, for example, a moulded seal.

The pressure-reducing valve according to the invention may also be in the form of a functional screw fitting.

Further advantages and forms of the invention will be explained in detail by means of the following description of an embodiment and the drawings.

In the drawings

Figure 2:
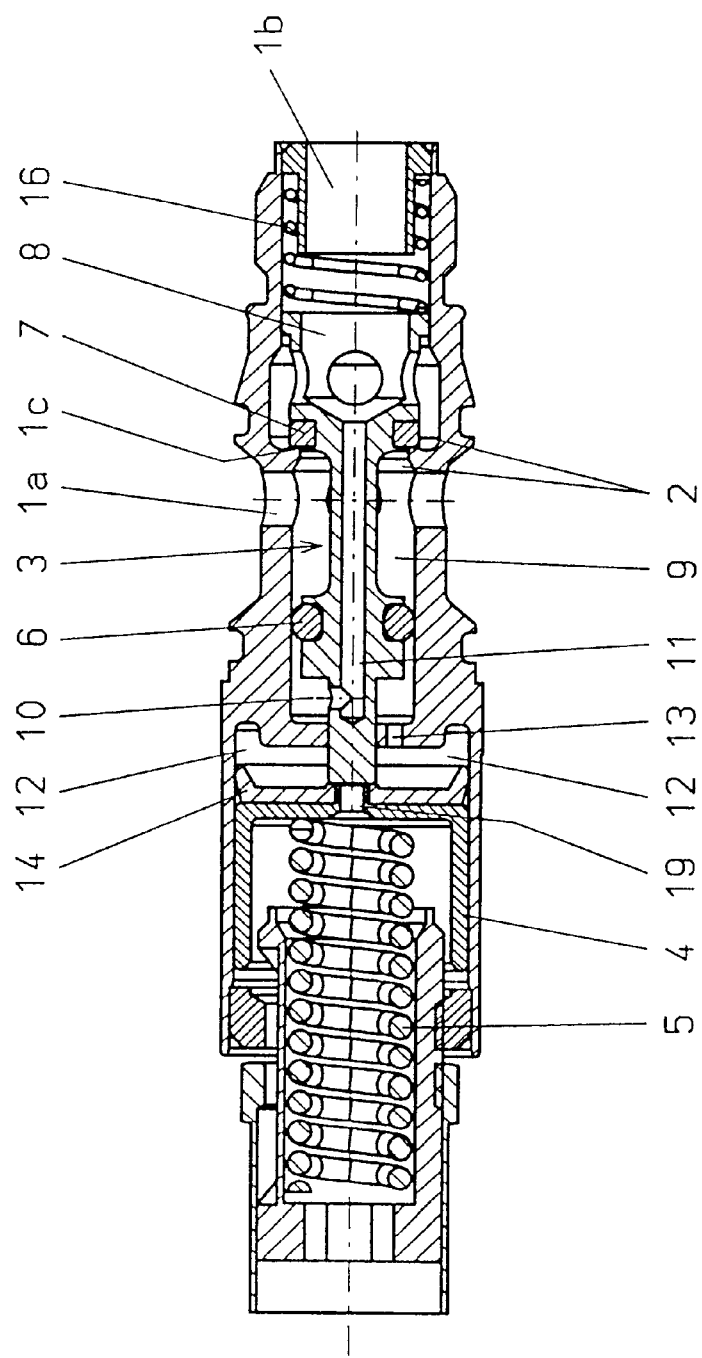
Figure 3:
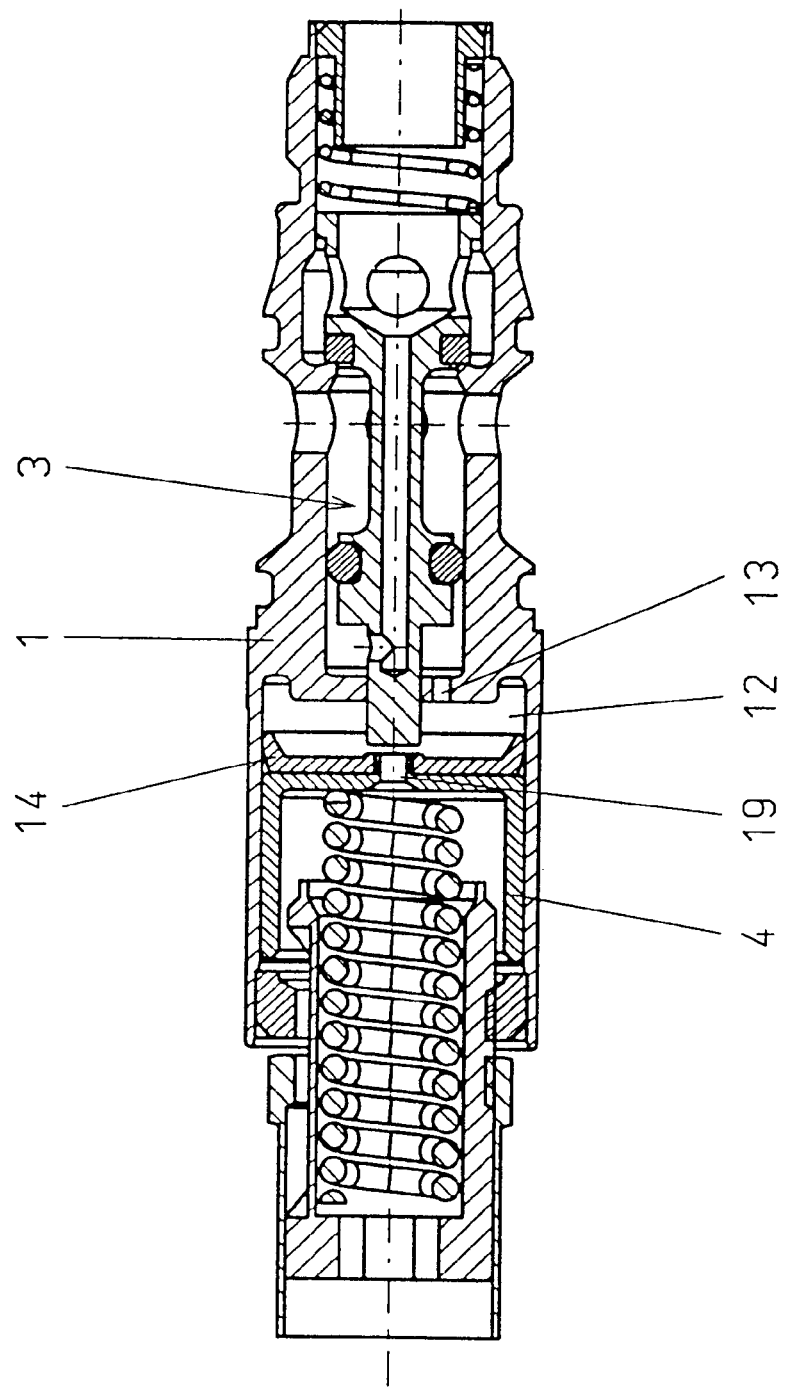
Figure 4:
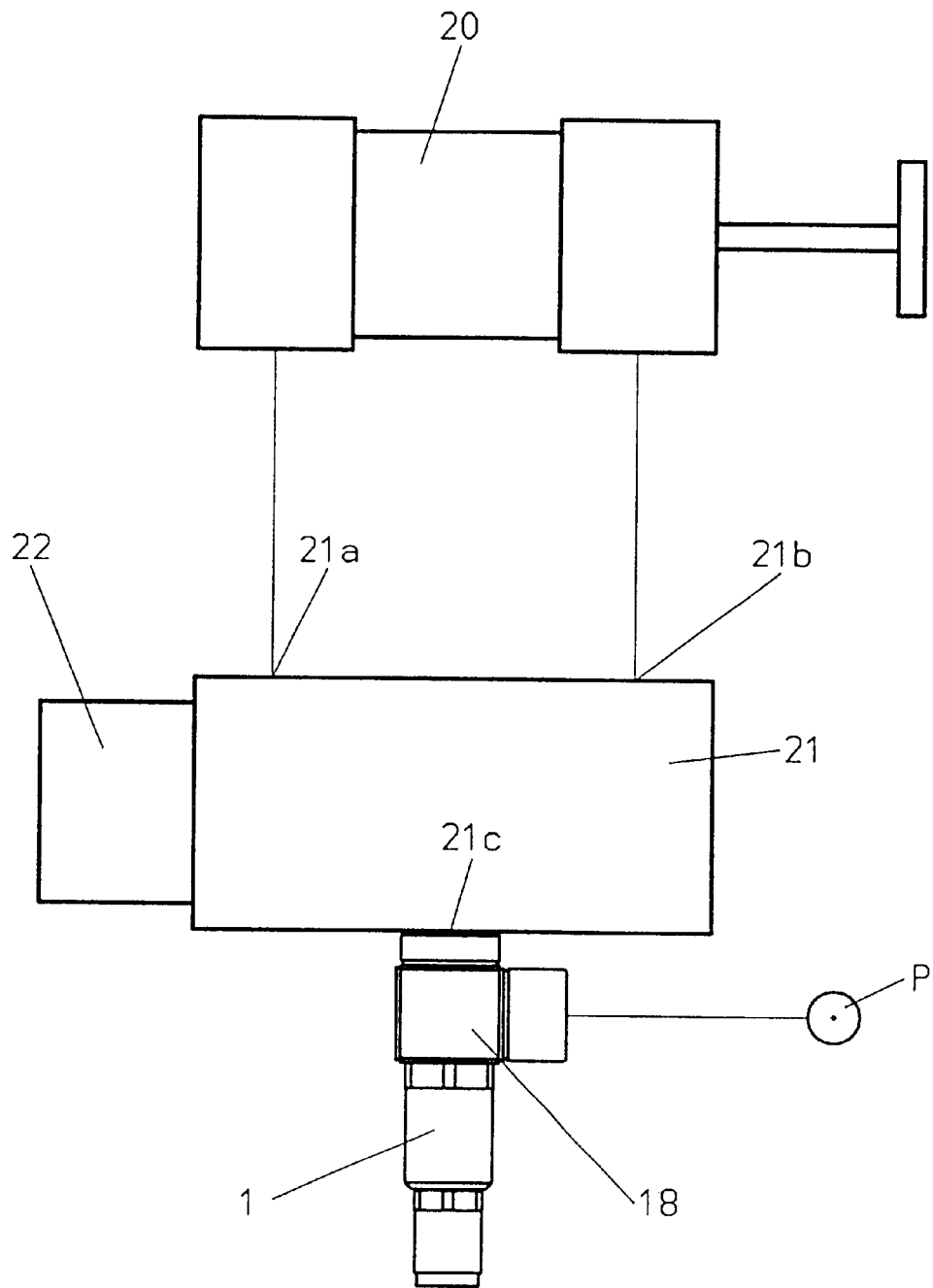

FIG. 1 is a sectional view of the pressure-reducing valve in a first operating state, FIG. 2 is a sectional view of the pressure-reducing valve in a second operating state, FIG. 3 is a sectional view of the pressure-reducing valve in a third operating state and FIG. 4 is a diagrammatic view of an application of the pressure-reducing valve.

In the following, the basic structure of the pressure-reducing valve shown in FIGS. 1 to 3 will first of all be explained in detail.

The pressure-reducing valve has a valve housing 1 which is in the form of a hollow screw and which provides a primary pressure connection 1a and a secondary pressure connection 1b. A first connecting duct 2 is arranged in the valve housing 1 between the primary pressure connection 1a and the secondary pressure connection 1b. In addition, a slide 3 which can be moved to and fro in the valve housing between an opening and a closing position of the valve duct 2 is provided. The slide 3 is forced by an operating element 4 by means of a spring 5 into the opening position shown in FIG. 1.

Seals 6, 7 are provided between the valve housing 1 and the slide 3, as a result of which a first pressure chamber 8 is formed at one end region 3a of the slide 3, a second pressure chamber 9 is formed in the central region 3b of the slide 3 and a third pressure chamber 10 is formed at the other end region 3c, the first and second pressure chambers 8, 9 being connected to one another in the opening position of the slide according to claim 1 by way of the first connecting duct 2.

A second connecting duct 11 connecting the first and third pressure chambers 8, 10 to one another is also formed in the slide 3.

Finally, a fourth pressure chamber 12 is provided in the region of the operating element 4 and is in operative connection with the secondary pressure connection 1b by way of a third connecting duct 13 provided in the valve housing 1, the secondary pressure prevailing in the fourth pressure chamber 12 acting on the operating element 4 against the force of the spring 5.

The second pressure chamber 9 is formed in the central region of the slide between the slide 3 and the valve housing 1 and is exposed to the primary pressure P by way of the primary pressure connection 1a. The first and third pressure chambers 8, 10 at the end regions of the slide 3 are also delimited by the slide 3 and the valve housing 1. Those two pressure chambers 8, 10 are exposed to the secondary pressure S by way of the secondary pressure connection. The third and fourth pressure chambers 10, 12 are connected to one another by way of the third connecting duct 13.

The seal 6 is in the form of an O-ring, is arranged in a corresponding circumferential groove in the slide 3 and cooperates with the valve housing 1. As a result, the second and third pressure chambers 9, 10 are sealed off from one another.

The seal 7, which is in the form of a square seal and which is arranged in a corresponding circumferential groove in the slide 3, is provided between the first and second pressure chambers 8, 9. The seal 7 cooperates with a valve seat 1c formed on the inner wall of the valve housing 1. If the seal 7 abuts the valve seat 1c, as in FIGS. 2 and 3, the first connecting duct 2 is closed. If the slide 3 is in the position shown in FIG. 1, the seal 7 has been lifted from the valve seat 1c and the first connecting duct 2 has been opened. In the opening position shown in FIG. 1, a pressure medium can pass from the primary pressure connection 1a to the secondary connection 1b via the first connecting duct 2 and drilled holes 3d in the end region 3a of the slide.

The operating element 4 is in the form of a piston and presses against the end region 3c of the slide 3 by means of the force of the spring 5. The operating element 4 and the valve housing 1 delimit the fourth pressure chamber 12 which is sealed off from the surrounding pressure by means of a third seal 14 which is in the form of a moulded seal.

The pressure with which the operating element 4 acts on the slide 3 can be set using an adjusting device 15. The adjusting device 15 has an adjusting nut 15a arranged securely in the valve housing 1, an adjusting screw 15b and a lock nut 15c. The spring 5 is arranged between the operating element 4 and the adjusting nut 15b. By turning the adjusting nut 15b, the length of the space available for the spring 5 can be altered, as a result of which a specific preloading of the spring 5 can be set. The axial adjustment is effected by turning the adjusting screw 15b relative to the adjusting nut 15a. The position of the adjusting screw can be secured by means of the lock nut 15c.

At the opposite end region 3a of the slide, the slide 3 cooperates with a second spring 16 which is supported by one end on the slide 3 and by the other end, in the embodiment shown, on a press-in ring 17.

The pressure-reducing valve shown in the drawing is in the form of a functional screw fitting. For that purpose, the valve housing 1 has, in the region of the secondary pressure connection 1b, an external thread 1d by means of which the valve can be screwed into a compressed-air consumer or a supply line.

In the case of a functional screw fitting, a so-called ring fitting, which is shown diagrammatically in FIG. 4 with the reference sign 18, is generally provided in the region of the primary pressure connection 1a. Ring seals which are arranged, for example, in the annular grooves 1e, if indicated in FIGS. 1 to 3, are provided between the ring fitting 18 and the valve housing 1.

The functioning of the pressure-reducing valve, and other forms are explained in detail hereinafter:

By setting the preloading of the spring 5 by means of the adjusting device 15, a so-called set pressure can be established, the slide 3 being moved from the opening position according to FIG. 1 into the closing position according to FIG. 2 when the secondary pressure S prevailing in the fourth pressure chamber 12 exceeds the set pressure.

In the operating state shown in FIG. 1, the secondary pressure S is thus still smaller than the set pressure established by the preloading of the spring. The pressure medium applied by way of the primary pressure connection 1a can thus pass unimpeded to the secondary pressure connection 1b via the first connecting duct 2 and the drilled holes 3d. The secondary pressure in the region of the secondary pressure connection will thus rise in accordance with the compressed-air consumers connected.

The secondary pressure S passes from the first pressure chamber 8 in the region of the secondary pressure connection 1b via the second connecting duct 11 into the third pressure chamber 10 and from there via the third connecting duct 13 into the fourth pressure chamber 12. The secondary pressure, which rises in the position shown in FIG. 1 in accordance with the compressed-air consumers connected, therefore prevails in the pressure chamber 12.

The two end regions 3a and 3c of the slide 3 are in a form such that the pressure exerted on the slide 3 by the secondary pressure in the first pressure chamber 8 and the third pressure chamber 10 is substantially compensated for. In addition, the slide 3 is so constructed in its central region 3b that the primary pressure prevailing there and acting on the slide 3 is compensated for.

The movement of the slide 3 is therefore determined substantially by the second spring 16, which forces the slide into the closing position, and by the operating element 4. By means of the spring 5, the operating element 4 forces the slide into the opening position in which the seal 7 is lifted from the valve seat 1c, while the secondary pressure prevailing in the fourth pressure chamber 12 acts against the spring.

As soon as the secondary pressure in the fourth pressure chamber 12 exceeds the set pressure of the spring 5, the operating element 4 according to FIG. 2 moves to the left. The slide 3 likewise performs a movement to the left owing to the second spring 16, the slide passing from the opening position into the closing position shown in FIG. 2. In the closing position, the seal 7 sits on the valve seat 1c, as a result of which the first connecting duct 2 is closed. In that position, the pressure medium applied to the primary pressure connection 1a can no longer pass to the secondary pressure connection 1b.

If, in the operating state according to FIG. 2, the secondary pressure is further increased in the fourth pressure chamber 12, the operating element 4 becomes detached from the slide 3 together with the third seal 14.

In the variant of the pressure-reducing valve shown in FIGS. 1 to 3, a ventilation opening 19 is provided in the fourth pressure chamber 12 in the contact region between the operating element 4 and the slide 3. The third seal 14, which is in the form of a moulded seal, thus seals two sealing sites, namely, on the one hand, the region between the operating element 4 and the inner wall of the valve housing 1 and, on the other hand, the region between the slide 3 and the ventilation opening 19.

In the operating state according to FIG. 3, the ventilation opening 19 has been opened, so that the pressure medium in the fourth pressure chamber 12 can escape via the ventilation opening 19. As the pressure in the fourth pressure chamber 12 continues to be reduced, the ventilation opening will close again by axial movement of the operating element 4, so that the operating state according to FIG. 2 is reached. As the consumption of the pressure medium by the connected compressed-air consumers increases, the secondary pressure will also be further reduced, so that the secondary pressure prevailing in the fourth pressure chamber 12 is no longer sufficient to compensate for the force of the spring 5 and the valve passes back into operating state 1 according to FIG. 1.

In another embodiment according to the invention, which is not shown in detail in the drawings, the ventilation opening 19 can also be omitted. The difference from the embodiment shown then resides in the fact that an excessively high secondary pressure cannot be compensated for immediately by way of a ventilation opening, but only as a result of corresponding consumption by the compressed-air consumers connected.

The pressure-reducing valve according to the invention is distinguished by a compact and small structure which is suitable especially for integration in a functional screw fitting.

Owing to the special form of the valve housing 1 and the slide 3, there is also secondary pressure relief in addition to primary pressure relief, that is to say, the axial forces on the slide, which are caused by the seals 6 and 7, are compensated for by suitably constructed active areas.

FIG. 4 shows an example of the application of the pressure-reducing valve described above.

The application shown involves a cylinder 20 which is to be acted upon by a specific secondary pressure by way of a directional control valve 21 during the forward and backward stroke. The directional control valve is controlled by means of a solenoid valve 22 in order thereby to set the forward stroke or backward stroke of the cylinder 20.

The directional control valve 21 has a first outlet 21a for the forward stroke and a second outlet 21b for the return stroke. The pressure medium for controlling the cylinder 20 is delivered by way of an inlet 21c, the directional control valve 21 connecting the inlet 21c to the first outlet 21a in order to perform the forward stroke, or to the second outlet 21b in order to perform the return stroke, as desired.

In order to prevent the cylinder 20 from having to be controlled with the high primary pressure, the pressure-reducing valve described in FIGS. 1 to 3 is screwed in at the inlet of the directional control valve 21. The external thread 1d of the pressure-reducing valve is therefore adapted to the internal thread which is normally provided at the inlet of directional control valves.

Thus, with the arrangement shown in FIG. 4, the cylinder 20 can be controlled with a secondary pressure which can be set by means of the pressure-reducing valve.

What is claimed is:

1. Pressure-reducing valve having
   a valve housing (1) which has a primary pressure connection (1a) and a secondary pressure connection (1b),
   a first connecting duct (2) provided in the valve housing between the primary pressure connection and the secondary pressure connection,
   a slide (3) which is movable to and fro in the valve housing between an opening and a closing position of the first connecting duct,
   an operating element (4) which forces the slide into the opening position by means of a spring (5),
   seals (6, 7) which are provided between the valve housing and the slide and by means of which a first pressure chamber (8) is formed at one end region (3a) of the slide, a second pressure chamber (9) is formed in the central region (3b) of the slide and a third pressure chamber (10) is formed at the other end region (3c), the first and second pressure chambers (8, 9) being connected to one another in the opening position of the slide (3) by way of the first connecting duct (2),
   a second connecting duct (11) formed in the slide (3) and connecting the first and third pressure chambers (8, 10) to one another,
   a fourth pressure chamber (12) which is provided in the region of the operating element (4) and which is in operative connection with the secondary pressure connection (16) by way of a third connecting duct (13) provided in the valve housing (1), the secondary pressure prevailing in the fourth pressure chamber (12) acting on the operating element (4) against the force of the spring (5),
characterised in that
   the second pressure chamber (9) in the central region (3b) of the slide is exposed to the primary pressure (P) by way of the primary pressure connection (1a),
   the first and third pressure chambers (8, 10) at the end regions (3a, 3c) of the slide are exposed to the secondary pressure (S) by way of the secondary pressure connection (1b), and
   the third and fourth pressure chambers (10, 12) are connected to one another by way of the third connecting duct (13).

2. Pressure-reducing valve according to claim 1, characterised in that a second spring (16) is provided which forces the slide (3) in the direction towards the operating element (4).

3. Pressure-reducing valve according to claim 1, characterised in that the seal (7) provided between the first and second pressure chambers (8, 9) cooperates with a valve seat (1c).

4. Pressure-reducing valve according to claim 1, characterised in that a ventilation opening (19) is provided in the fourth pressure chamber (12) and is arranged in the contact region between the operating element (4) and the slide (3).

5. Pressure-reducing valve according to claim 1, characterised in that an adjusting device (15) for setting the preloading of the first spring (5) is provided, by means of which a set pressure is established, the slide (3) being moved from the opening position into the closing position when the secondary pressure prevailing in the fourth pressure chamber (12) exceeds the set pressure.

6. Pressure-reducing valve according to claim 1, characterised in that a first seal (7) is provided between the first and second pressure chambers (8, 9), a second seal (6) is provided between the second and third pressure chambers (9, 10) and a third seal (14) is provided to seal the fourth pressure chamber (12).

7. Pressure-reducing valve according to claim 6, characterised in that the third seal (14) is in the form of a moulded seal.

8. Pressure-reducing valve according to claim 1, characterised in that the pressure-reducing valve is in the form of a functional screw fitting.

9. Pressure-reducing valve according to claim 1, characterised in that the fourth pressure chamber (12) has a ventilation opening (19) which is provided in the contact region between the operating element (4) and the slide (3), and the third seal (14) is in the form of a moulded seal, the moulded seal sealing both a first sealing site between the operating element and the valve housing and a second sealing site between the slide (3) and the ventilation opening (19).

* * * * *